June 7, 1927.          W. YERMAK          1,631,180
BEET PULLER
Filed April 27, 1926
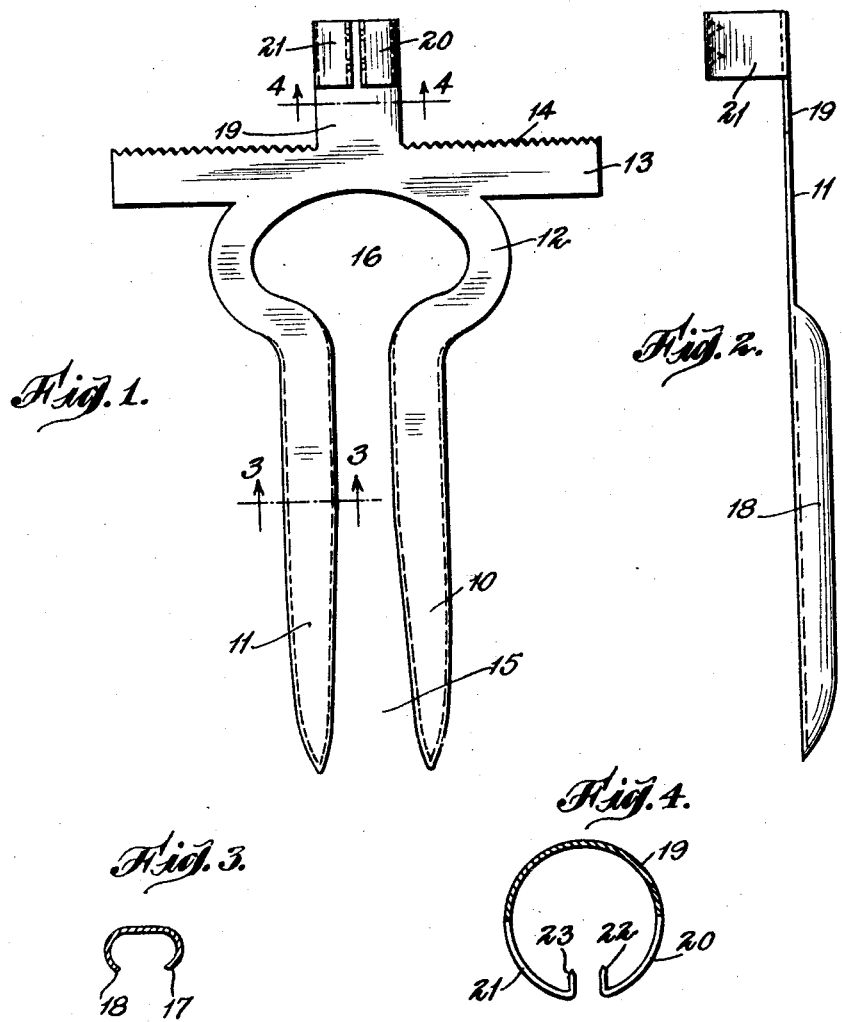
Inventor
William Yermak Patented June 7, 1927.

UNITED STATES PATENT OFFICE.

WILLIAM YERMAK, OF DANBURY, CONNECTICUT.

BEET PULLER.

Application filed April 27, 1926. Serial No. 104,933.

This invention relates to improvements in agricultural implements and particularly to a beet puller or lifter, and it is the principal object of my invention to provide an implement of this type allowing a ready pulling or lifting of the beets or the like without damaging the same or injuring their skin.

Another object of the invention is the provision of an implement for pulling or lifting of beets or the like of simple and inexpensive construction, yet durable and positive and efficient in its operation.

A further object of the invention is the provision of a beet puller allowing a ready attachment of the implement to a handle or the like.

A still further object of the invention is the provision of a beet lifter provided with means for allowing an operation of the same by foot power, in order to press the implement into the soil for a sufficient distance.

These and other objects and advantages of my invention will become more fully known as the description thereof proceeds, and will then be specifically defined in the appended claim.

In the accompanying drawing, forming a material part of this disclosure:

Fig. 1 is a front elevation of a beet puller constructed according to my invention.

Fig. 2 is a side edge view thereof.

Fig. 3 is a section on line 3—3 of Figure 1 through one of the prongs of the puller.

Fig. 4 is a section through the neck of the implement.

As illustrated on the drawing, the beet puller or lifter is substantially fork-shape with the two prongs 10 and 11 connected at their upper ends by a loop 12 having integrally made therewith at its upper end, a cross-beam 13 or the like provided with a toothed upper face as at 14 for engagement by the feet of the operator for pressing the implement into the soil with the prongs at both sides of a beet root gripped within the space 15 separating the prongs and allowing the beet to slide into the space 16 formed by the loop.

As shown, the marginal edges of the prongs are bent for a certain distance out of the plane of the prong bodies to form flanges 17 and 18 respectively for protecting the beet against injury of their skins by the implement.

A neck 19 is formed integrally with the beam 13, and the upper part of this neck is shaped into a pair of oppositely disposed curved blanks 20, 21, ending in spurs 22, 23 adapted to enter the material of a handle or the like in the space formed by the cheeks and the neck.

The operation of my device will be entirely clear from the above description without further explanation, and it is to be understood that such changes as come within the scope of the appended claim may be made in the construction of the implement here shown as an example of the many ways for practically constructing the same without deviation from the purpose and gist of my invention.

Having thus described my invention, what I claim as new and desire to secure by Letters Patent is:

A beet puller comprising a cross-beam, having handle connecting means on one side thereof, beet engaging prongs on the other side, said prongs being formed with opposing loops adjacent the beam, and the free ends being spaced and slightly divergent, curved flanges on the prongs bent out of the plane of the same and extending from the loops to their ends, foot engaging teeth on the cross-beam adjacent the handle attaching means, all substantially as described.

In testimony whereof I affix my signature.

WILLIAM YERMAK.